United States Patent
Hoffmann (10) Patent No.: US 10,034,432 B2
(45) Date of Patent: Jul. 31, 2018

(54) BALE FORMING APPARATUS AND METHOD WITH OVERLOAD PROTECTION

(71) Applicant: FORAGE INNOVATIONS B.V., Maassluis (NL)

(72) Inventor: Steffen Hoffmann, Maassluis (NL)

(73) Assignee: FORAGE COMPANY BV, Maassluis (NL)

( * ) Notice: Subject to any disclaimer, the term of this patent is extended or adjusted under 35 U.S.C. 154(b) by 101 days.

(21) Appl. No.: 15/030,149

(22) PCT Filed: Oct. 28, 2014

(86) PCT No.: PCT/NL2014/050739
§ 371 (c)(1),
(2) Date: Apr. 18, 2016

(87) PCT Pub. No.: WO2015/065173
PCT Pub. Date: May 7, 2015

(65) Prior Publication Data
US 2016/0235007 A1    Aug. 18, 2016

(30) Foreign Application Priority Data

Oct. 28, 2013  (NL) ...................................... 2011682

(51) Int. Cl.
*A01F 15/08*    (2006.01)
*A01F 15/07*    (2006.01)
*A01F 15/10*    (2006.01)

(52) U.S. Cl.
CPC ........ *A01F 15/085* (2013.01); *A01F 15/0715* (2013.01); *A01F 15/0765* (2013.01);
(Continued)

(58) Field of Classification Search
CPC ................ A01F 15/085; A01F 15/0715; A01F 15/0765; A01F 15/0833; A01F 15/106; A01F 2015/077
See application file for complete search history.

(56) References Cited

U.S. PATENT DOCUMENTS 4,446,746 A    5/1984  Aoshima et al.
4,611,535 A *  9/1986  Anstey .................... A01F 15/07
                                                      100/43

(Continued)

FOREIGN PATENT DOCUMENTS

DE    10 2007 031 187 A1    1/2009
EP    2 151 156 A2            2/2010
(Continued)

*Primary Examiner* — Robert E Pezzuto
*Assistant Examiner* — Adam J Behrens (57) ABSTRACT

An apparatus and a method for forming a bale from loose material are disclosed. A feeder feeds loose material to a bale former. The bale former forms a bale from loose material. A feeding-side output shaft drives the feeder. A forming-side output shaft drives the bale former. An input shaft drives both output shafts. A torque measuring arrangement measures a value indicative of the input torque provided by the input shaft. If the input torque value exceeds a given torque threshold, a control unit triggers the bale former for reducing the torque consumption taken from the forming-side output shaft.

11 Claims, 3 Drawing Sheets

(52) U.S. Cl.
CPC ........ *A01F 15/0833* (2013.01); *A01F 15/106* (2013.01); *A01F 2015/077* (2013.01)

(56) References Cited

U.S. PATENT DOCUMENTS

| | | | |
|---|---|---|---|
| 5,014,560 A | 5/1991 | Hutchison et al. | |
| 6,012,271 A * | 1/2000 | Wilkens ................ | A01F 15/085 100/88 |
| 6,530,311 B1 * | 3/2003 | Wilkens .............. | A01F 15/0833 100/40 |
| 7,727,114 B2 * | 6/2010 | Tarasinski .............. | A01B 71/06 180/53.7 |
| 7,784,364 B2 | 8/2010 | Matzoll et al. | |
| 8,577,559 B2 * | 11/2013 | Hel ...................... | A01B 61/025 701/50 |
| 9,585,297 B2 * | 3/2017 | Bonte ................. | A01F 15/0841 |
| 2010/0036569 A1 * | 2/2010 | Hel ...................... | A01B 61/025 701/50 |

FOREIGN PATENT DOCUMENTS

| | | |
|---|---|---|
| EP | 2 250 876 A1 | 11/2010 |
| EP | 2 292 085 A1 | 3/2011 |

* cited by examiner

BALE FORMING APPARATUS AND METHOD WITH OVERLOAD PROTECTION

1. FIELD OF THE INVENTION

The invention refers to a bale forming apparatus (baler) and a bale forming method for forming a bale from loose material, in particular from agricultural crop material.

For operating such a baler, in particular for driving the feeding means and the bale forming means, sufficient torque is required. An overload situation must not cause damage. The available mechanical or electrical power for driving rotating baler parts, however, is restricted—in particular if the baler is pulled by a tractor over ground and the tractor is the only power source. Different solutions have been provided for coping with the problem of an overload situation.

2. BACKGROUND OF THE INVENTION

U.S. Pat. No. 6,012,271 discloses a baler with a main drive 7 having two output shafts 8 and 9. The output shaft 8 drives the rollers 2 of the bale forming chamber via a main drive roller 12. The output shaft 9 drives the conveying rotor 4 and the pick-up member 3. A torque indicator 16 serves as a load sensor for the output shaft 8 for the rollers 2, 12. An overload clutch 17 secures the output shaft 9 for the feeding devices 4, 3. The torque indicator 16 is also connected with the overload clutch 17. In one embodiment the feeding units 4, 3 are switched off if a bale has to be wrapped.

The baler described in DE 102007031187 A1 distributes driving torque by means of a main gear box 11 onto the pick-up unit 7 comprising a pick-up rotor and onto a pressing chamber 6 surrounded by belts 5. The gear box 11 is driven by an input shaft 10. A first output shaft 12 drives a roller 4 for the pressing chamber 6 and has an overload clutch 16 and a fly wheel 17. A second output shaft 15 drives the pick-up unit 7. A sensor 25 measures a force which depends on the torque transmitted by the first output shaft 12. A clutch 23 is arranged between the main gear box 11 and the pick-up unit 7. A gear shift 30 between the gear box 11 and the first output shaft 12 can change the rotational speed of the belts 5 with respect to the pick-up unit 7, cf. [0029].

In EP 2250876 A1 a baler 14 pulled by a tractor 12 is disclosed. Several belts 36 surround a bale forming chamber of the baler 14, cf. FIG. 1. Crop material is picked-up and guided through a flow path 58 into the bale forming chamber. An automatic reaction how to handle a plug 16 is described. A "plug" may be a blockade, a restriction, or an overload situation, cf. [0020].

In case of such a plug 16 a controller 60 of the baler 14 of EP 2250876 A1 activates several actuators 44 to 56. In the embodiment this activation step causes the following steps, cf. [0013]: A baffle 30 is moved away from the material flow path 58. Knives 32 drop away from the flow path 58. A drop floor 34 moves away from the flow path 58. The tension of the pressing belts 36 is reduced. An example is given in par. [0018]: The available PTO drive power is diverted to areas where this power is most needed. In the example the driving tractor 112 yields no more than 150 HP at the PTO shaft. 50 HP is used for forming a bale and 100 HP is used for feeding crop material through a crop slug. If a plug 16 occurs in the crop slug, the tension of the belt 36 may be reduced such that only 20 HP is used for rotating the bale whereas 130 HP is used for feeding material through the feeder. The ability of the baler 14 is enhanced.

3. SUMMARY OF THE INVENTION

A problem solved by the invention is to provide a bale forming apparatus with the features of the preamble of claim 1 and a bale forming method with the features of the preamble of claim 12 wherein the bale forming apparatus should be deactivated due to an overload situation as seldom as possible and wherein no data connection between a control unit of the bale forming apparatus and a control unit or a sensor of a further apparatus, e. g. a pulling vehicle, is required.

This problem is solved by a bale forming apparatus with the features of claim 1 and by a bale forming method with the features of claim 12. Preferred embodiments are specified in the depending claims.

The bale forming apparatus according to the invention comprises
 a bale forming means,
 a feeding means,
 a drive arrangement,
 a torque measuring arrangement, and
 a control unit.
The drive arrangement comprises
 an input shaft,
 a feeding-side output shaft, and
 a forming-side output shaft.
The bale forming apparatus is operated as follows:
 The feeding means conveys loose material to the bale forming means.
 The bale forming means forms a bale from the conveyed loose material which is conveyed to the bale forming means.
 The feeding-side output shaft drives the feeding means for the purpose that the feeding means conveys the loose material.
 The forming-side output shaft drives the bale forming means for the purpose that the bale forming means forms the bale from the loose material.
 The input shaft drives the feeding-side output shaft as well as the forming-side output shaft. For driving these two output shafts, the input shaft provides an input torque.
 The torque measuring arrangement measures at least one time a value indicative of the input torque which is provided by the input shaft.
 The control unit monitors the measured input torque value(s).
 If the or at least one measured input torque value is above a given torque threshold, the control unit triggers the bale forming means. The bale forming means is triggered such that the torque consumption taken by the forming-side output shaft is reduced as a reaction on a triggering control input from the control unit.

4. ADVANTAGES

During the operation of the bale forming apparatus the quantity, the mass flow, and/or the physical or chemical properties of the conveyed loose material can vary rapidly, in particular if the baler belongs to a vehicle which is pulled over ground and picks up loose material from the ground. A rigid object, e.g. a stone, may be picked up and be conveyed by the feeding means together with loose material towards the bale forming means. Or a clump of loose material is conveyed to the bale forming means. Both events suddenly increase the feeding-side torque consumption. Nevertheless no part of the bale forming apparatus must be damaged due to an overload situation.

For ensuring this goal, a bale forming apparatus often comprises an overload mechanism, e.g. an overload clutch, which interrupts the operation of the input shaft in the case of an overload. This overload mechanism inhibits a damage of the input shaft due to an overload. The invention can be used in connection with such an overload mechanism. But thanks to the invention the overload mechanism will interrupt more seldom the input shaft and nevertheless the input shaft of the bale forming apparatus will not be damaged due to a high load. Reducing the number of executed overload interruptions increases the throughput through the baler. Thanks to the invention the throughput and performance of the bale forming apparatus is therefore increased without increasing the risk that the bale forming apparatus—or a vehicle pulling the bale forming apparatus—is damaged by overload.

According to the invention the control unit triggers a reduction of the torque which the bale forming means takes from the forming-side output shaft. As the input shaft drives both output shafts, this torque reduction reduces the overall torque which the input shaft has to provide for driving the two output shafts. This feature enables that an interruption of the input shaft due to an overload situation needs to be performed less often. Thanks to the forming-side torque reduction more torque for driving the feeding means is provided. Therefore more mechanical power for conveying loose material to the bale forming means is provided. In many cases the bale forming means can continue its operation with reduced forming-side torque consumption. The feeding means, however, always requires sufficient torque for conveying the loose material for a non-interrupted operation.

The invention is in particular useful if the bale forming means surrounds a bale forming chamber and if the feeding means feeds a varying amount of loose material towards and into the bale forming chamber and if this amount can hardly or not at all be controlled or limited or predicted in advance and can increase rapidly while forming a bale. In this case the torque consumption of the feeding-side output shaft can rapidly increase.

Thanks to the invention a sudden increase of the feeding-side torque consumption can at least partially be compensated by a reduction of the forming-side torque consumption. This forming-side torque consumption reduction increases the time required for forming a bale and reduces the baler performance significantly less than activating an overload mechanism, e.g. an overload clutch which often entirely interrupts the bale formation.

Thanks to the invention the occurrence of a high input torque value does not require amending the operation of the feeding means such that the feeding means consumes less torque. A measure for reducing the feeding-side torque consumption often leads to a significant reduction of the baler's performance. If the bale forming apparatus is a part of a vehicle which is pulled or is driven over ground and picks up loose material from the ground, a feeding-side torque consumption reduction would require reducing the travelling velocity of the vehicle or interrupting the operation of a pick-up unit of the vehicle. Both operations are often not desired as they reduce the performance of the bale forming apparatus. In addition such a measure can achieve the torque reduction too late. The invention saves the need for performing such measures.

Thanks to the invention no amount sensor for measuring the conveyed amount of loose material or measuring the mass flow (amount per time) is needed for detecting a high load onto the feeding means. The torque measuring arrangement suffices for detecting a high load.

Thanks to the invention the measured high torque consumption of the input shaft is reduced by a reduction of the forming-side torque consumption. This reduction is performed by the control unit of the bale forming apparatus using signals from the torque measuring arrangement on board of the bale forming apparatus. The control unit of the bale forming apparatus does not need signals from further sensors. In particular no signals from sensors outside of the baler are needed. For triggering the forming-side torque consumption reduction, the baler control unit does not require control inputs from a further device. Therefore no data connection between the control unit of the bale forming apparatus and a control unit or a user terminal of a further apparatus, e.g. of a pulling tractor, needs to be established. The same bale forming apparatus can subsequently be connected with different vehicles pulling the bale forming apparatus without necessarily establishing a data connection between the baler and the pulling vehicle.

Preferably the baler's control unit can process control inputs from a human operator. But thanks to the invention the control unit can trigger the torque consumption reduction in a fully automated manner, i.e. without relying on inputs from a human operator. Therefore the baler can react very quickly, often with in seconds or even within a part of a second, to a high input shaft torque.

The bale forming apparatus according to the invention can easily be adapted to different operating conditions, e.g. to different expected kinds of loose material to be pressed to bales or different environmental conditions (e.g. moisture, temperature, rain, wind). These different operating conditions can cause different expected feeding-side torque consumptions. To cope with these constraints, it suffices to amend the given torque threshold. This threshold adaptation can often be implemented purely by amending control software. For implementing the invention on an existing baler, no mechanical baler part needs to be added or amended. The baler needs not to be transported to a workshop for implementing the invention.

5. PREFERRED EMBODIMENTS

In one embodiment an overload clutch of the bale forming apparatus interrupts and/or disconnects the input shaft in the case of an overload situation. In the case that an increasing torque consumption or increasing gradient of the torque consumption of the input shaft is detected the overload clutch is triggered and activated. If this increasing torque exceeds a given overload threshold, the overload clutch disengages the input shaft. As long as the input shaft is disengaged, the bale forming apparatus cannot process loose material.

Preferably the torque threshold for triggering the forming-side torque consumption reduction is below the overload threshold for interrupting the input shaft by activating the overload clutch. Therefore an increasing input torque first reaches the torque threshold. As a reaction the baler's control unit shifts torque consumption from the bale forming means to the feeding means. This torque consumption shift often suffices to keep the input torque value below the overload threshold. The overload clutch is only activated if this torque consumption shift does not suffice to keep the input torque value below the overload threshold. Therefore the overload clutch is less often activated. The baler performance is increased without the need of amending the overload threshold.

Every event of interrupting the input shaft by activating the overload clutch reduces the throughput of the bale forming apparatus. Therefore such an overload clutch should interrupt the input shaft as seldom as possible. In order to reduce the number of input shaft interruptions caused by overload clutch activations, the bale forming apparatus according to one embodiment of the invention comprises an actuator for the bale forming means. This actuator decreases the torque consumption of the bale forming means after having obtained a corresponding trigger signal from the control unit. The control unit triggers the torque reduction for the bale forming means if the input torque is above a given torque threshold. The actuator can decrease the torque consumption very quickly.

In one implementation of the forming-side torque reduction the bale forming means comprises at least one pressing belt. The or every pressing belt is tensioned, surrounds a bale forming chamber, and applies pressure onto loose material in the bale forming chamber. The actuator decreases the pressing belt tension. In a further implementation the actuator increases the size of a bale forming chamber, e.g. the diameter of a drum-shaped bale forming chamber or the cross-sectional area of a pressing channel. This measure also reduces the pressure onto the loose material and causes a forming-side torque consumption reduction.

Sometimes not only a high input torque should be avoided but also a quick increase of the input torque. For solving this task the respective current value indicative of the input torque is measured several times, e.g. with a given sampling rate. The control unit derives the temporal change (gradient) of the input torque and monitors the increase of the input torque.

The control unit triggers the torque consumption reduction if at least one of the following events is discovered:
The current input torque value is over the given torque threshold.
The input torque increases and the torque increase exceeds a given torque gradient threshold.

In one embodiment the torque measuring arrangement measures the value indicative of the input torque directly at the input shaft. In a further embodiment the torque measuring arrangement derives the input torque value by aggregating two measured torque values. In this embodiment the torque measuring arrangement comprises a forming-side torque sensor and a feeding-side torque sensor both arranged on board of the bale forming apparatus. The forming-side torque sensor measures the torque at the forming-side output shaft—in general: a value indicative of the forming-side torque. The feeding-side torque sensor measures the torque at the feeding-side output shaft—in general: a value indicative of the feeding-side torque. These two torque sensors operate independently from each other. The control unit derives an input torque value from
the measured forming-side torque value and
the measured feeding-side torque value.

In one embodiment the feeding-side torque sensor measures the feeding-side torque with a feeding-side sampling rate. The forming-side torque sensor measures the forming-side torque with a forming-side sampling rate. The feeding-side sampling rate is identical with or higher than the forming-side sampling rate. This embodiment can be of advantage as the feeding-side torque can vary more quickly than the forming-side torque.

Thanks to the embodiment with the two independent torque sensors the bale forming apparatus can react automatically and even more quickly on an increasing load on the feeding-side output shaft. The control unit can quickly reduce the forming-side torque consumption. The feeding-side torque sensor measures directly the feeding-side torque. This sensor detects a feeding-side load increase earlier than a sensor which measures the torque at the input shaft of the bale forming apparatus or at the PTO shaft of the tractor. The reason: A high load onto the feeding means first increases the feeding-side torque and afterwards—via the feeding-side output shaft applying a higher load onto the input shaft—the input torque. Therefore the bale forming apparatus according to the embodiment with the two torque sensors can quicker react on a high load of the feeding means. This embodiment further reduces the number of activations of the overload clutch. In addition this embodiment saves the need to measure a value directly at the input shaft.

According to this embodiment two torque values are measured, namely the forming-side torque value and the feeding-side torque value. The input torque value is calculated by aggregating the two torque values. The embodiment enables to generate dedicated alerts and messages to a human operator comprising automatically generated up-to date statements about these three torque values. Therefore a human operator can better be guided to control the bale forming apparatus. In addition it is easier to reduce the forming-side torque consumption automatically or manually only as much as necessary. The embodiment can also be used for a fully automatic control input which can reduce the input torque consumption in an even more directed way.

In one implementation the input shaft drives a transmission arrangement. The transmission arrangement drives
the forming-side output shaft with a forming-side transmission ratio and
the feeding-side output shaft with a feeding-side transmission ratio.

The two transmission ratios can coincide or can differ from each other. At least one transmission ratio differs from 1:1. This implementation can better protect the input shaft as the input shaft has to yield less torque and rotates faster (transmission ratio greater than one). The input shaft can easier be adapted to the rotational velocity of a PTO shaft driving the input shaft. The control unit uses the two transmission ratios for deriving the input torque value from the feeding-side torque value and the forming-side torque value.

In one embodiment a torque sensor directly measures the torque at the input shaft, at the forming-side output shaft and/or at the feeding-side output shaft. In an alternative embodiment a further physical value is measured. This further physical value is logically connected with the torque and is therefore a value indicative of the torque.

In one implementation the pressure or force which the conveyed loose material applies onto the feeding means and/or on the bale forming means is a measure for the input torque. In one embodiment of the respective torque sensor the rotated input shaft tends to rotate a further part of the bale forming apparatus while driving the two output shafts. A retaining means prevents this part from actually being rotated. A force sensor measures the force which is applied onto this retaining means. This force is a value indicative of the input torque. In the case of an electrical drive the consumption of electrical energy may be a measure for the input torque. This electrical energy consumption is measured. If a hydraulic motor drives at least one baler part, the pressure of a fluid in a closed loop can be measured and be used as a value indicative of the torque. A torque sensor for measuring the feeding-side torque or the forming-side torque can be implemented in an analogous way.

In one embodiment the bale forming means forms under pressure a bale in the bale forming chamber. A pressure varying means can vary the pressure exerted by the bale forming means onto the loose material. The control unit triggers a decrease of the power or torque consumption taken by the bale forming means by actuating the pressure varying means such that the pressure exerted by the bale forming means onto the loose material in the bale forming chamber decreases. This embodiment yields a quick decrease of the torque.

In one implementation of this embodiment the bale forming means comprises one pressing belt or several parallel pressing belts. Every pressing belt surrounds the bale forming chamber. The pressing belts are driven and rotate a bale in the bale forming chamber. Loose material injected into this bale forming chamber applies a pressure onto every pressing belt. The pressing belts are preferably elastic and can be extended under pressure and apply a counter-pressure onto the loose material in the bale forming chamber. The pressing belts provide a bale forming chamber with variable size. The pressing belts exert a pressure onto the increasing bale in the bale forming chamber. The pressure varying means can vary and in particular can decrease this pressure. This pressure reduction measure reduces the forming-side torque consumption.

In one implementation of a bale forming apparatus with this pressure varying means every pressing belt is guided around several guiding member, e.g. around several guiding and deflecting rollers. At least one guiding member is mounted on a pivotal holding member, e.g. a tensioning arm assembly. The increasing bale in the bale forming chamber expands against the pressing belts and tends to pivot the holding member. A retaining means, e.g. a piston-cylinder device, is connected with the holding member and actively applies a pivoting force or passively applies a retaining force onto the holding member. This retaining force keeps the pivotal holding member in a position where the pressing belts exerts a pressure onto the loose material in the bale forming chamber and prevents the holding member from actually being pivoted. The retaining means comprises a control device, e.g. a controlled valve, which keeps the applied pressure under a given threshold. The valve is opened if the applied pressure reaches the threshold. This retaining means and an actuator for the retaining means belong to the pressure varying means of the embodiment.

In one implementation the actuator can decrease the retaining force which the retaining means applies onto the pivotal holding member. For reducing the forming-side torque consumption the control unit triggers the actuator for the retaining means to reduce the retaining force.

This actuator can comprise a controlled valve as a valve can be opened very quickly and can rapidly release pressure from a closed loop with fluid. The actuator can comprise a relief valve which releases a fluid in a fluid chamber of the retaining means. Such a relief valve can release fluid very quickly and can therefore effect a reduction of the torque consumption of the bale forming means very quickly. Later the fluid can be transferred back into the retaining means.

It is also possible that the retaining means comprises two retaining parts which work in parallel wherein every retaining part applies a retaining force onto the pivotal holding member. The actuator disables one retaining part whereas the other retaining part continuous to apply retaining force onto the holding member.

In a further embodiment the pressure onto the bale is applied by several pressing rollers which belong to the bale forming means and surround a drum-shaped bale forming chamber. At least one pressing roller can be shifted laterally or is pivotally mounted, e.g. on a pivot holding arrangement, such that the pressing roller can be moved perpendicular to its own rotating axis. Moving this pressing roller in a direction perpendicular to its rotating axis changes the diameter of the bale forming chamber and varies the pressure exerted onto the bale in the bale forming chamber. The pressure varying means shifts or pivots this pressing roller such that the applied pressure is decreased. The pressure varying means can comprise a retaining means. For reducing the forming-side torque consumption, the control unit triggers the retaining means such that the retaining means decreases the retaining force applied onto the pivotal holding arrangement for the or every moveable pressing roller.

These embodiments reduce the torque consumption taken by the bale forming means by decreasing the pressure which the at least one pressing belt or the pressing rollers applies onto loose material in the bale forming chamber. These embodiments are in particular of advantage if the feeding means conveys a clump of loose material and this clump is to be injected into the bale forming chamber. As the size of the bale forming chamber is increased, it causes less power and therefore less torque to inject this clump into the bale forming chamber. Therefore not only the forming-side torque consumption is reduced but often also the feeding-side torque consumption.

The reduction of the torque consumption taken by the bale forming means can be combined with a measure for reducing the torque which is required for feeding loose material to the bale forming chamber. But thanks to the invention it is not necessary to do so. One measure can be that the cross-sectional area of a feeding channel guiding into the bale forming chamber is enlarged. The loose material is conveyed through this feeding channel towards the bale forming chamber. The cross-sectional area is preferably actively enlarged by the step that an actuator lowers down the pivotally mounted feeding channel bottom. Or the crop material can pivot or shift the feeding channel bottom against the force of a retaining means (a mechanical or hydraulic spring, e.g.) and an actuator releases the feeding channel bottom. In a further embodiment several cutting knives engage into the feeding channel during normal operation. For reducing the torque consumption these cutting knives are entirely or at least partially pivoted out of the feeding channel.

In one implementation first the forming-side torque consumption is reduced if a first input torque value is above the torque threshold. If a further input torque value which is later measured is also above the torque threshold, one of the measures for reducing the feeding-side torque consumption is performed.

One embodiment of the invention inhibits that the forming-side torque consumption reduction for the bale forming means can lead to a bale which is too large or too heavy. This can in particular happen if the bale is formed in a bale forming chamber and has nearly reached the desired size or weight when the torque consumption of the bale forming means is triggered. The compressing pressure onto the bale may be decreased by the torque consumption which increases the chamber size and thereby the bale size.

In the embodiment a bale size sensor measures a dimension or further physical property of the bale, e.g. the diameter of a round-cylindrical bale or the length of a string of compressed material or the bale weight. A bale size threshold is given which is preferably below the required final bale size. The control unit triggers the reduction of the forming-side torque consumption if the input torque value reaches the given torque threshold and if the measured bale size is below the bale size threshold. If the input torque reaches the given torque threshold and the bale size is above the bale size threshold, however, the feeding-side torque consumption is reduced by reducing the performance of the feeding means such that less loose material is conveyed to the bale forming means and the bale size increases more slowly.

In one implementation the feeding means is operated with a reduced operating velocity or is even interrupted. Or the travelling velocity of a vehicle comprising the baler is reduced. Less or even no further loose material is conveyed towards the bale forming means. This reduces the feeding-side torque consumption and makes the bale size and bale weight no longer increasing.

In one implementation the bale forming apparatus comprises a wrapping device. This wrapping device wraps a round bale in the bale forming chamber. The wrap prevents the bale from falling apart after having being ejected out of the bale forming chamber. The control unit triggers the wrapping device to start the wrapping of a bale in the bale forming chamber if the bale size has reached the given bale size threshold and if the input torque value reaches the given torque threshold—even if the bale size has not reached a required final bale size, i.e. the bale is not yet as large as required. The given bale size threshold is below the required final bale size. Thanks to this implementation a wrapped bale is produced which may be a little bit too small—in place of forming a bale which is too large and can heavily be wrapped at all.

In one embodiment the bale forming means forms a bale, preferably a round-cylindrical bale, in a bale forming chamber which is surrounded by a stationary housing and a discharge gate. The discharge gate is pivotally mounted at the stationary housing. The bale forming apparatus can be operated in a closed mode in which the discharge gate is rigidly connected with the front housing. In the closed mode the bale forming chamber—with the exception of inlets for picked-up loose material and for wrapping material—is entirely surrounded by the stationary housing and the discharge gate. The bale forming means creates the bale in this bale forming chamber. In one embodiment the discharge gate can be opened such that a finished bale can be ejected.

In known balers the discharge gate can be pivoted into a bale forming position and into a bale ejecting position. According to one embodiment of the invention the discharge gate can additionally be pivoted into an intermediate position. In order to reduce the torque consumption taken by the bale forming means the discharge gate can be pivoted away from the stationary housing such that the bale forming chamber is enlarged but the bale forming means continues to form a bale in the bale forming chamber or wraps such a bale. This mode is called the "enlarged mode" whereas the mode with the discharge gate being rigidly connected with the stationary housing is called the "closed mode". It is possible that also in the enlarge mode the discharge gate is rigidly connected with the stationary housing. It is also possible that a gap occurs between the discharge gate and the stationary housing. This embodiment with the closed mode and the enlarged mode can be combined with several pressing rollers for pressing a bale. Some of these pressing rollers are mounted at the stationary housing and some pressing rollers are mounted at the discharge gate. The bale forming apparatus can be transferred very quickly into the enlarged mode. This transfer reduces quickly the torque consumption of the bale forming means as the chamber size increases.

In a further embodiment the bale forming chamber is arranged as a pressing channel with an inlet and an outlet. The feeding means injects loose material through the inlet into the pressing channel. An oscillating piston or a further suitable compacting means compresses the loose material in the pressing channel and forms a string of pressed loose material. In one embodiment the forming-side output shaft drives a plunger which in turn drives the oscillating piston. For reducing the forming-side torque consumption, the control unit decreases the pressure or force with which the plunger drives the piston.

In one embodiment the bale forming apparatus comprises a pressing piston and a pressing channel. The piston oscillates in the pressing channel and presses loose material in order to form a string of pressed material. The forming-side output shaft drives this piston, e.g. via a connecting rod. If the string of pressed material has reached a desired length, the string is wrapped such that a wrapped cuboid bale is formed. This bale is shifted out of the pressing channel.

The invention can be applied to such a square baler as follows: The piston oscillates in a front segment of the pressing channel and does not reach a rear segment of the channel. At least one sidewall of the rear segment can be pivoted such that the cross-sectional area of the rear segment is changed. An actuator can pivot this sidewall. In this embodiment the torque consumption taken by the bale forming means is decreased as follows: The control unit generates a trigger signal for the sidewall actuator. The sidewall actuator pivots the sidewall or reduces the pressure onto the sidewall such that the cross-sectional area is enlarged. This step reduces the counter-pressure which the loose material in the pressing channel applies onto the oscillating piston. In one implementation the retaining force of a retaining means applying a force onto the pivotal sidewall is reduced and the pressure of the crop material pivots the sidewall laterally. This reduction can be achieved by automatically opening a relief valve of the retaining means.

In one embodiment the bale forming apparatus is arranged as a part of a vehicle, e.g. an agricultural harvester, which is adapted for driving or being pulled over ground. The feeding means picks up loose material from the ground while the vehicle is moved over ground. In a further embodiment the bale forming apparatus is arranged as a stationary apparatus. Loose material is conveyed to the feeding means and the feeding means feeds this loose material into the bale forming chamber.

The loose material may be agricultural material (hay, straw, silage) or recycling material or paper or cartridges or waste, e.g.

In one embodiment the bale forming apparatus comprises an own motor which drives the input shaft. This embodiment can in particular be used if the bale forming apparatus is a part of a stationary plant or belongs to a self-propelled vehicle. In an alternative embodiment a motor of a further vehicle or other apparatus drives the input shaft. This embodiment can in particular be used if the bale forming apparatus is a part of non-propelled vehicle which is pulled over ground by a propelled vehicle, e.g. by a tractor. A driven PTO shaft of the tractor is mechanically connected with the input shaft and drives it.

These and other aspects of the invention and of the preferred embodiment will be even more apparent from the detailed embodiment as described below and will be elucidated in detail there.

7. DETAILED DESCRIPTION OF EMBODIMENT

In the embodiment the invention is used in a bale forming apparatus which creates round-cylindrical bales from loose agricultural material (hay, straw, silage, e.g.). Such an apparatus is also known as a "round baler". The baler is mechanically and electrically connected with a tractor. The tractor pulls the baler over ground.

A pick-up unit with several spring-mounted tines picks up loose crop material from the ground while the baler is moved over ground. A pick-up drum is rotated and carries the pick-up tines. Suddenly a clump of crop material may be picked-up. Without intention the pick-up unit may also grasp dirt, soil, or a rigid object, e.g. a stone or a rigid garbage object, lying on the ground. A heavy rain can increase the moisture and thereby the density of the crop material. Therefore the operating conditions can change suddenly.

A conveying rotor with rigid tines conveys and presses the picked-up loose material through a feeding channel towards the inlet of a bale forming chamber. In one embodiment the conveying rotor presses the loose material through the gaps between knives of a cutting assembly.

The conveyed loose material is injected through the inlet into the bale forming chamber. A bale forming means presses the injected loose material together and thereby forms a cylindrical bale. This bale is formed and rotated in the bale forming chamber. After the bale has reached a given size or weight or as soon as a further wrapping start condition is fulfilled, the bale in the bale forming chamber is wrapped into a net or a plastic foil or sheet. A discharge gate of the baler is opened and the wrapped bale is ejected out of the bale forming chamber.

Figure 1:
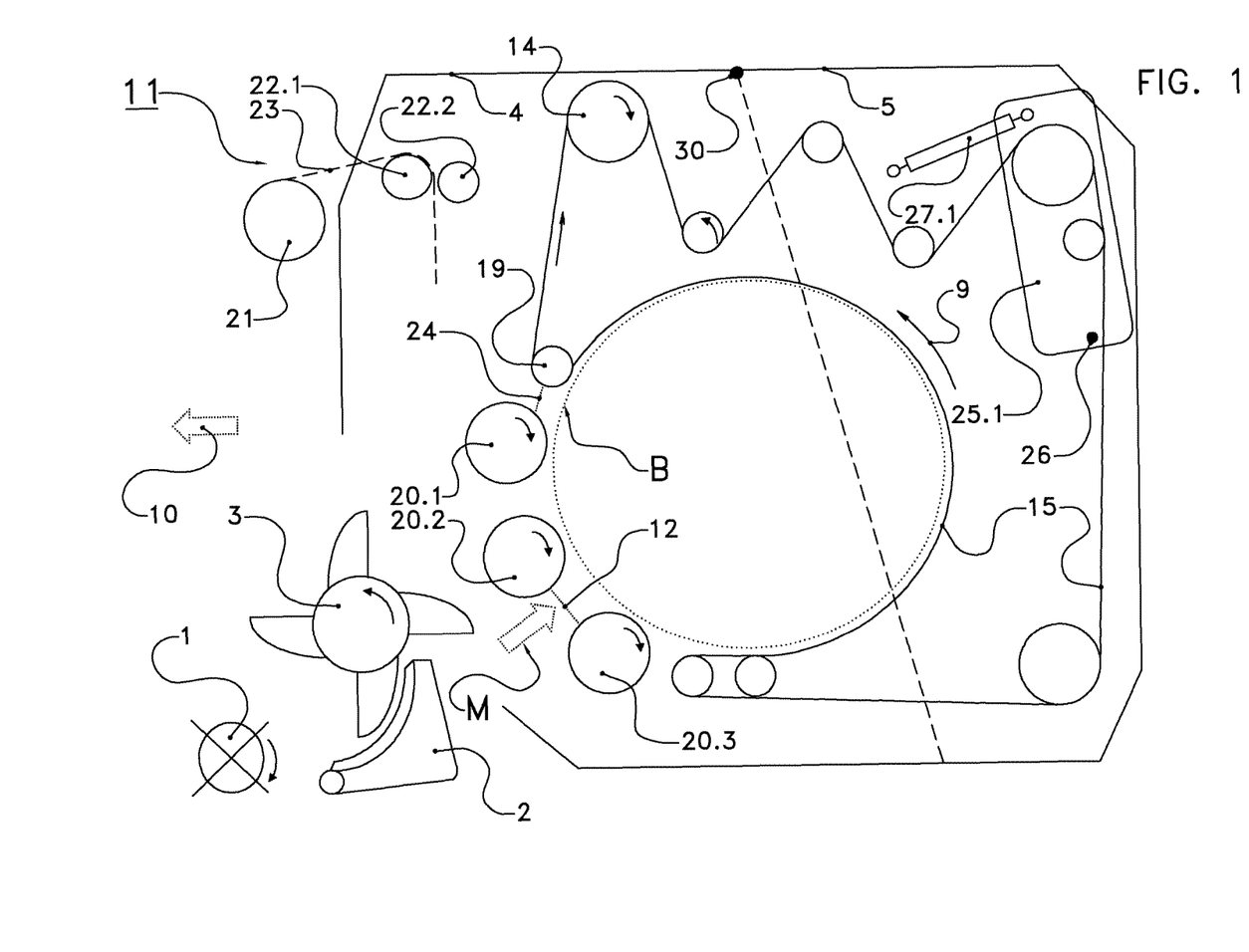
FIG. 1   shows schematically in a side view around baler in which the invention is used.

The schematic side view of FIG. 1 shows a round baler which is moved over ground in the travelling direction 10. FIG. 1 shows the following parts of the baler:
   a pick-up unit 1,
   a cutting assembly with several pivotally mounted knives 2 arranged along a shaft being perpendicular to the travelling direction 10,
   a conveying rotor 3 above the knives 2 wherein the rotor 3 comprises several rigid tines,
   a front housing (stationary casing part) 4,
   a tailgate (discharge gate) 5 pivotally mounted at the front housing 4 in a pivoting axis 30 perpendicular to the drawing plane of FIG. 1,
   a bale forming chamber in which a bale B is just formed by a bale forming means, and
   a wrapping apparatus 11 in front of the front housing 4.
The bale forming means comprises
   several parallel pressing belts 15,
   three driven pressing rollers (starter rollers) 20.1, 20.2, 20.3, and
   at least one roller 14 for driving the belts 15.
The rotating axes of the rollers 14, 19, 20.1, 20.2, 20.3 are perpendicular to the drawing plane of FIG. 1 and perpendicular to the travelling direction 10. The bale forming means rotates the bale B around an axis perpendicular to the traveling direction 10 (in FIG. 1 from right to left) and to the drawing plane of FIG. 1.

In one embodiment the bale forming means comprises several pressing rollers which are arranged along the circumferential surface of the bale forming chamber. The pressing rollers touch and press the loose material in the bale forming chamber. In one embodiment no roller can be shifted laterally. These pressing rollers define a bale forming chamber with fixed size, i.e. every bale has the same size. In a further embodiment some pressing rollers are mounted on a pivotal holding means.

In a further embodiment the bale forming chamber is surrounded by one pressing belt or by several parallel pressing belts and in addition by at least one bale supporting roller (starter roller). The loose crop material being injected into the bale forming chamber tensions the pressing belt(s) and enlarges the diameter of the bale forming chamber defined by the stretched pressing belt(s). The pressing belts apply a counter-pressure onto the loose material in the bale forming chamber. Therefore a bale forming chamber with variable size is provided.

The conveying rotor 3 of the baler shown in FIG. 1 conveys picked-up crop material M towards the crop material inlet 12 into the bale forming chamber. This inlet is provided by the nip 12 between the two driven pressing rollers (starter rollers) 20.2, 20.3 arranged below the bale B in the bale forming chamber.

The round baler of FIG. 1 creates the bale B by means of several parallel pressing belts 15 surrounding and thereby defining a drum-shaped bale forming chamber with variable diameter. These pressing belts 15 are guided around several guiding rollers. The pressing rollers 20.1, 20.2, 20.3 and the pressing belts 15 rotate the cylindrical bale B in a rotating direction 9 which is in FIG. 1 anti-clockwise.

The pressing belts 15 of the baler with variable bale forming chamber size are guided around several guiding rollers, among them the driven roller 14 and the idler roller 19. In the embodiment several of these guiding rollers are rotatably mounted between a left tensioning arm and a corresponding right tensioning arm (not shown). Their rotating axles extend from the left arm to the right arm. The terms "left" and "right" refer to the travelling direction 10.

Both tensioning arms are pivotally mounted. The loose material injected into the bale forming chamber presses against the parallel pressing belts and pivots the tensioning arms with the guiding rollers. These tensioning arms are pivoted against the force of a retaining means, e.g. of two controlled hydraulic piston-cylinder devices. The tensioning arms are only pivoted if the pivoting force applied by the pressing belts 15 onto the tensioning arms exceeds the retaining force yielded by the retaining means.

In the embodiment of FIG. 1 the movable idler rollers are mounted between a left tensioning arm 25.1 and a corresponding right tensioning arm 25.2 (not shown). These tensioning arms 25.1, 25.2 can rotate around the common rotating axis 26 which is perpendicular to the drawing plane of FIG. 1 and to the travelling direction 10. The increasing bale B in the bale forming chamber pulls at the pressing belts 15 and tends to pivot the tensioning arms 25.1, 25.2 around the rotating axle 26 towards the bale B by shortening those segments of the pressing belts 15 which do not surround the bale forming chamber. Enlarging the bale forming chamber makes the surrounding segments larger and shortens the other segments.

A left hydraulic piston-cylinder device 27.1 and a corresponding right hydraulic piston-cylinder device 27.2 (not shown in FIG. 1) serve as the retaining means and apply a retaining force onto the tensioning arms 25.1, 25.2. It requires a retaining force to press the cylinders into the respective tubes of the devices 27.1, 27.2. This retaining force tends to inhibit the tensioning arm 25.1, 25.2 from being rotated towards the bale B. The piston-cylinder devices 27.1, 27.2 operate like pressure springs. The increasing bale B tends to pull at the pressing belts 15 and to rotate the tensioning arms 25.1, 25.2 against the force of the retaining means 27.1, 27.2 towards the front housing 4. This effect tensions the pressing belts 15. Of course it is also possible that the retaining force is required for pulling the cylinders out of the tubes.

The pick-up unit 1 and the conveying rotor 3 belong to the feeding means of the embodiment. The driven roller 14, the pressing rollers 20.1, 20.2, 20.3, the pressing belt(s) 15, the tensioning arms 25.1, 25.2, and the retaining means 27.1, 27.2 belong to the bale forming means.

The angle about which the tensioning arms 25.1, 25.2 are rotated by the growing bale B is measured. This rotating angle is a measure for the pressure which the growing bale B applies onto the pressing belts 15. This pressure corresponds with the diameter of the bale B. The rotating angle is therefore a value indicative of the bale size. It is also possible that an optical sensor measures in a non-contacting manner the pivoting angle of the tensioning arms 25.1, 25.2. In one embodiment a scale measures the weight of the bale B in the bale forming chamber.

As soon as the bale B has reached a given size (diameter) or weight, the process that the wrapping apparatus 11 wraps the bale B into wrapping material 23 is triggered. The wrapping material 23 may be a net or a plastic sheet or a foil. A driven pulling roller 22.1 and an idler pulling roller 22.2 pull wrapping material 23 from a rotatably mounted reel 21. The wrapping material 23 is clamped between the rollers 22.1, 22.2 and is injected through the nip 24 between the two rollers 20.1, 19 into the bale forming chamber. This nip 24 serves as a wrapping material inlet. A net pusher or a roller, e.g. the pressing roller 20.1, shifts the sagging wrapping material 23 towards this nip 24.

The rotating bale B grasps the injected web of wrapping material 23. Several layers of wrapping material 23 are placed around the rotating bale B. Afterwards the wrapping material 23 is severed. The tailgate 5 is opened and the wrapped bale B is ejected out of the bale forming chamber.

Figure 2:
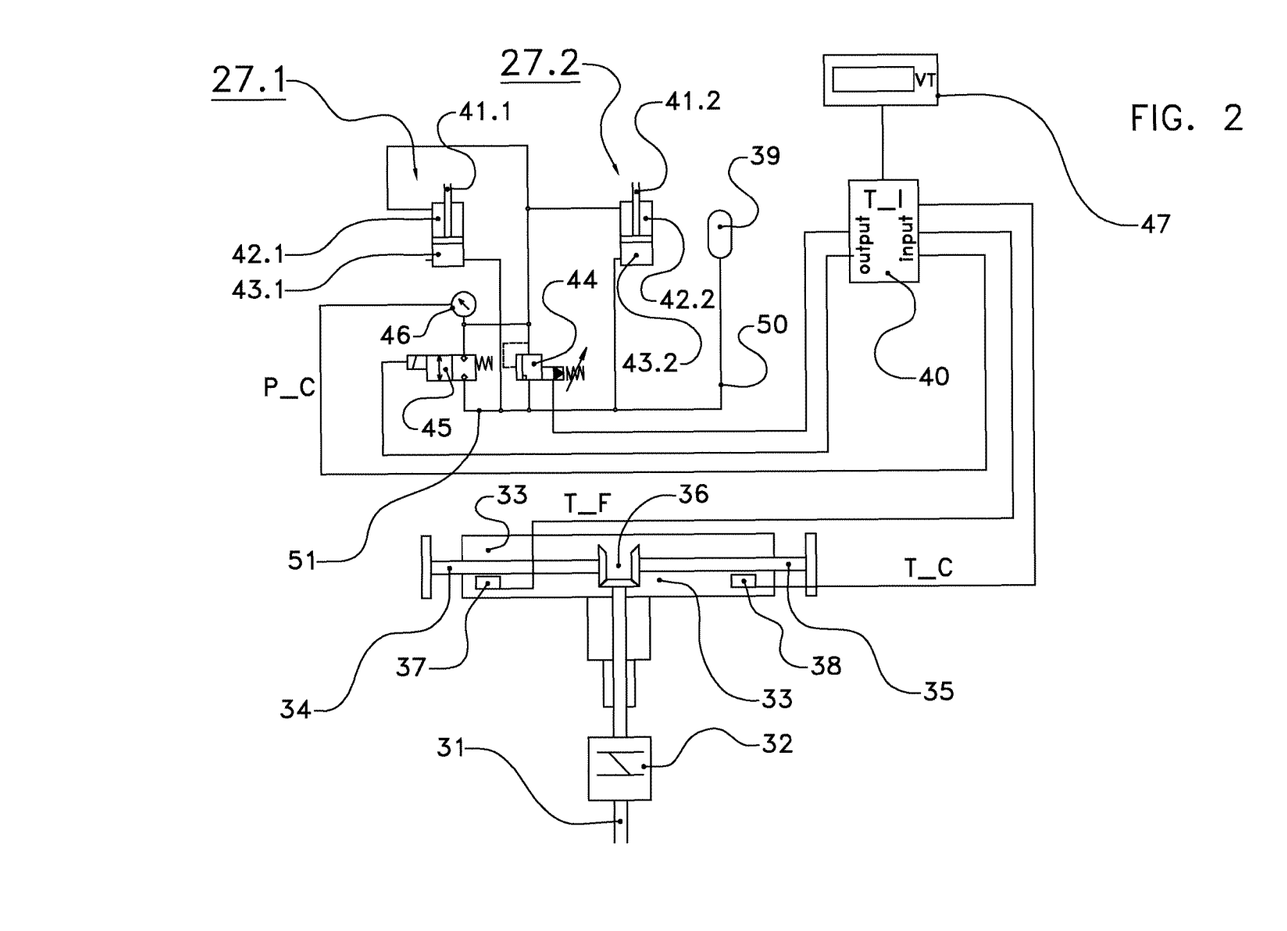
FIG. 2   shows a diagram with the drive arrangement and the actuators according to the embodiment.

FIG. 2 shows schematically the drive arrangement and the torque shifting system of the baler. The PTO shaft of the pulling tractor (not shown) drives an input shaft 31 of the baler. An overload clutch 32 is arranged in the driven input shaft 31. In the case of an overload situation the overload clutch 32 interrupts the input shaft 31 and disconnects the power train leading from the tractor motor to the rotating parts of the baler. The clutch 32 interrupts the input shaft 31 if the torque at the input shaft 31 is above a given overload threshold.

The input shaft 31 ends in a transmission assembly 33. In the embodiment this transmission assembly 33 drives a feeding-side output shaft 34 and a chamber-side output shaft 35. Both shafts 34, 35 start in the transmission assembly 33.

In the embodiment the input shaft 31 extends parallel to the travelling direction 10 (in FIG. 2 from top to bottom) whereas the output shafts 34, 35 extend perpendicular or angular to the travelling direction 10. Therefore the transmission assembly 33 according to one embodiment comprises a bevel gear 36. Different alternative embodiments are possible regarding how the rotational power of the input shaft 31 is split up and transferred for driving two output shafts 34, 35 and for achieving desired transmission ratios. Some possible embodiments are chain drives, sprocket wheel drives, or drives with pulleys and belts.

The feeding-side output shaft 34 drives the pick-up unit 1 and the conveying rotor 3 and in one implementation an actuator for pivoting the feeding channel bottom or the knives 2. The chamber-side output shaft 35 drives the pressing rollers 20.1, 20.2, 20.3, the driven guiding roller 14 for the pressing belts 15, the driven pulling roller 22.1 of the wrapping apparatus 11 and in one embodiment an actuator (not shown) for the tailgate 5. These rotating parts are connected with the respective output shaft 34, 35 by means of chains or sprocket wheels or further shafts, e. g.

In the embodiment the transmission ratio between the input shaft 31 and the feeding-side output shaft 34 is 2:1, i.e. the input shaft 31 rotates two times faster than the feeding-side output shaft 34. The transmission ratio between the input shaft 31 and the chamber-side output shaft 35 is also 2:1. It is possible that an alternative transmission ratio is implemented, e.g. by adapting the bevel gear 36.

It is possible that the input torque is directly measured at the input shaft 31. But in the embodiment no torque sensor is arranged at the input shaft 31. In contrast two torque sensors 37, 38, namely a feeding-side torque sensor 37 and a forming-side torque sensor 38, are arranged downstream from the bevel gear 36 and yield signals which are used for calculating the input torque.

The signals from the two torque sensors 37, 38 and thereby the input torque are continuously monitored. The embodiment with the two torque sensors 37, 38 decreases the time delay between the occurrence and the detection of a high input torque at the input shaft 31. In addition the torque is measured near the source of a potential high torque, i.e. near the feeding means and near the bale forming means and downstream from the transmission arrangement 33.

The feeding-side torque sensor 37 measures the torque T_F at the feeding-side output shaft 34. The forming-side torque sensor 38 measures the torque T_C at the chamber-side output shaft 35. These two torque sensors 37, 38 operate independently from each other.

Different torque sensors may be used, e.g. those which are described in U.S. Pat. Nos. 4,446,746, 5,014,560, and 7,784, 364 B2.

In one basic implementation of a torque sensor 37, 38 a part of the transmission assembly 33 is pivotally mounted. The rotating input shaft 31 tends to pivot this part of the transmission assembly 33. Or one output shaft 34, 35 tends to rotate this part. A force sensor measures the force which is required to keep the pivotally mounted part in its position against the rotating force of the input shaft 31 or of one output shaft 34, 35.

A further basic implementation for a torque sensor can be used if the input shaft 31 drives a chain. This chain is guided over a stretching roller and is stretched by this stretching roller. The chain tends to shift the stretching roller. The force applied onto the stretching roller is measured.

As the transmission ratio of the embodiment is 2:1, the torque T_I at the input shaft 31 is calculated as T_I=(T_F+T_C)/2. In general the torque T_I is calculated as T_I=T_F/r_F+T_C/r_C wherein r_F and r_C are the transmission ratios for the feeding-side output shaft 34 and the forming-side output shaft 35, resp.

The two torque sensors 37, 38 measure the current torque at the output shafts 34, 35 with a sufficiently high sampling rate. In one embodiment the sampling rate of the feeding-side torque sensor 37 is larger than the sampling rate of the forming-side torque sensor 38. In a further embodiment two similar torque sensors with the same sampling rate are used.

Signals with the measured torque values T_C, T_F are transmitted to a job controller 40 of the baler, e.g. via a CAN bus or a further data network implemented on board of the baler. This job controller 40 automatically processes signals, creates control inputs, and operates as the control unit in the sense of the claims. The job controller 40 automatically derives the current input torque value T_I by applying the formula sketched above onto the two measured torque values T_F, T_C and compares T_I with a given torque threshold.

In the embodiment the given torque threshold is below the overload threshold for triggering the overload clutch 32.

In one embodiment the job controller 40 further derives a current (instantaneous) change dT_I/dt of the input torque T_I over time, i.e. a torque gradient. The job controller 40 compares this torque gradient with a given gradient threshold.

As mentioned above the increasing bale B tends to shorten those segments of the pressing belts 15 which do not surround the bale forming chamber. This makes the tensioning arms 25.1, 25.2 rotating around the common rotating axle 26 towards the bale B. As the tensioning arms 25.1, 25.2 are connected by guiding rollers, both tensioning arms 25.1, 25.2 can only be pivoted about the same pivoting angle. A left retaining piston-cylinder device 27.1 and a right retaining piston-cylinder device 27.2 together apply a retaining force onto the tensioning arms 25.1, 25.2.

Every piston-cylinder device 27.1, 27.2 comprises
a piston 41.1, 41.2 comprising a piston rod,
a tube, and
a cylinder chamber (cavity) surrounded by the tube.

Every piston 41.1, 41.2 can be moved along the longitudinal axis of the tube and separates the cylinder chamber into
a part 42.1, 42.2 through which the piston rod of the piston 41.1, 41.2 extends (the rod side, in FIG. 2: the upper part of the cylinder 27.1, 27.2) and
a part 43.1, 43.2 between the piston 41.1, 41.2 and the bottom of the cylinder 27.1, 27.2 (the base side, in FIG. 2: the lower part).

The piston 41.1, 41.2 is pivotally connected with the corresponding tensioning arm 25.1, 25.2. If the increasing bale B pivots the tensioning arms 25.1, 25.2 towards the bale B, the pistons 41.1, 41.2 are moved along the longitudinal axis of the tube. In one embodiment the pistons 41.1, 41.2 are pressed towards the bottom of the cylinder such that the volumes of the lower parts (base-side chambers) 43.1, 43.2 are decreased. In an alternative embodiment the increasing bale B pulls the pistons 41.1, 41.2 out of the corresponding cylinder chamber such that the volumes of the upper parts (rod-side chambers) 42.1, 42.2 are decreased. This event decreases the volume of the upper parts 41.1, 41.2 and increases the volume of the lower parts 43.1, 43.2.

In the embodiment a closed loop filled with oil or with a further hydraulic fluid is formed. This closed hydraulic loop comprises:
the two upper parts (rod-side chambers) 42.1, 42.2,
the two lower parts (base-side chambers) 43.1, 43.2,
an accumulator 39 comprising a membrane which separates two accumulator chambers within the accumulator 39,
a control valve 44,
a high-speed relief valve 45,
a pressure transmitter 46 including a pressure sensor, and connecting lines which allow the fluid to flow from one part to a further part of the closed loop.

The connection lines can be flexible, e.g. implemented with hoses, or can be rigid, e.g. implemented by means of rigid pipelines.

In a preferred embodiment no air can enter or leave the closed loop.

The accumulator 39 serves as a reservoir which balances variations of the fluid in the operating segment. These variations can stem from different operating temperatures of the fluid or of the bale. The accumulator 39 therefore helps to keep the pressure of the fluid in the operating segment within a given range. This reservoir 39 comprises a membrane which divides the chamber of the reservoir 39 into two parts—one part filled with fluid and one part filled with air. Guiding fluid into the reservoir 39 under pressure enlarges the part with the fluid and stretches the membrane.

The control valve 44 separates this closed hydraulic loop into a closed operating segment and a reserve segment. The operating segment provides the retaining function and comprises the two upper parts 42.1, 42.2 (first embodiment in which the increasing bale B pulls the pistons 41.1, 41.2 out of the cylinders 27.1, 27.2) or the two lower parts 43.1, 43.2 (second embodiment in which the increasing bale B presses the pistons 41.1, 41.2 towards the bottom of the cylinders 27.1, 27.2).

The control valve 44 limits the pressure of the fluid in the operating segment. If the fluid pressure in the operating segment exceeds a given pressure threshold, the control valve 44 opens a pressure releasing line 51 such that fluid is guided from the operating segment into the reserve segment. This pressure releasing line 51 bypasses the pistons 41.1, 41.2 and connects the operating segment with the reserve segment and is opened and closed by the control valve 44.

In one embodiment this reserve segment comprises the two lower parts 43.1, 43.2 (first embodiment) or the two upper parts 42.1, 42.2 (second embodiment). The reserve segment is also implemented as a closed fluid loop.

In a further embodiment the reserve segment only comprises one part 42.1, 42.2, 43.1 or 43.2 of one cylinder 27.1, 27.2. The corresponding part of the other cylinder 27.2, 27.1 is filled with a further fluid, e.g. with air, and can be emptied by opening a further valve (not shown). This further embodiment saves connecting lines. Or the reserve segment comprises two separated assemblies.

In both embodiments the two pistons 41.1, 41.2 move synchronously in the two cylinders 27.1, 27.2 without canting or without a shift between the pistons 41.1, 42.2.

The pressure threshold applied by the control valve 44 can be set by a human operator. This pressure threshold determines the common pivoting angle of the tensioning arms 25.1, 25.2 as a reaction onto a pressure value applied by the pressing belts 15 and therefore as a reaction on the pressure which the bale B applies onto the pressing belts 15. The baler is arranged such that the reserve segment of the closed loop suffices for all pressure thresholds that the operator might determine.

The pressure transmitter 46
measures the current pressure P_C of the fluid in the operating segment of the closed loop and
generates a corresponding electrical signal.

This signal P_C for the pressure is transmitted to the job controller 40. In one embodiment the job controller 40 controls the valve 44. In a further embodiment the signal for the measured pressure P_C is directly transmitted to the control valve 44.

The job controller 40 can generate alerts and further messages for a human operator. These messages are displayed on a virtual terminal 47 which is connected with the job controller 40 via a data network. This virtual terminal 47 is mounted in the driver's cabin of a pulling tractor, e.g.

In one embodiment at least some of the following measured values and given thresholds are displayed:
- the current size of the bale B,
- the feeding-side torque T_F,
- the chamber-side torque T_C,
- the derived input torque T_I,
- the derived input torque gradient dT_I/dt,
- the given torque threshold for the input shaft 31,
- the given gradient threshold and
- the measured pressure P_C in the operating segment.

In one embodiment a graph showing the values for the input torque T_I for different time points is displayed. The given torque threshold is also displayed in this graph for the operator. A visual and/or acoustical alert is generated and output to the operator if the input torque T_I is near the given torque threshold. Displaying these values supports the operator to drive and to steer the pulling tractor near the performance limit of the tractor and of the baler without an overload situation.

As mentioned above the increasing bale B pivots the tensioning arms 25.1, 25.2 towards the bale B. In one embodiment this event pulls the pistons 41.1, 41.2 out of the corresponding cylinders 27.1, 27.2 and increases the volume of the lower parts 43.1, 43.2 when the control valve 44 is opened. The pistons 41.1, 41.2 press fluid out of the upper parts 42.1, 42.2. The fluid bypasses the pistons 41.1, 41.2 and is guided through connecting lines into the lower parts 43.1, 43.2 as long as the pressure in the operating segment is above the given pressure threshold. Therefore the pressure is decreased until the control valve 44 is closed again. The cylinders 27.1, 27.2 are arranged such that the space provided by the lower parts 43.1, 43.2 suffices for every pressure threshold which can be set by the human operator. In a further embodiment the increasing bale B presses the piston 41.1, 41.2 towards the bottom of the cylinders 27.1, 27.2 which step decreases the volume of the lower parts 43.1, 43.2. Fluid is pressed out of the lower parts 43.1, 43.2 through the connecting lines to the upper parts 42.1, 42.2. In both cases the operating segment of the closed loop belongs to the retaining means.

In the embodiment this closed loop does not comprise a pump for the fluid. The fluid circulates in the operating segment by the pressure which the bale B applies onto the pistons 41.1, 41.2 and the pressure threshold of the control valve 44. A balanced state occurs.

In a further embodiment the closed loop comprises an actuator for moving fluid in the closed loop, e.g. a pump. If the pressure in the operating segment is below a given lower threshold, this actuator shifts fluid from the reserve segment into the operating segment. This embodiment yields to an approximately constant tension of the belt even if no further crop material is injected into the bale forming chamber and the bale is compressed such that its diameter decreases. The fluid pressure in the operating segment is always between this lower threshold and the pressure threshold for the central valve 44.

In the embodiment the closed loop further comprises a high-speed relief valve 45. The control unit triggers the relief valve 45. This relief valve 45 can be implemented by means of a switching ball valve and is triggered by setting the relief valve 45 under electric current.

In a further embodiment the relief valve 45 comprises a piston which is moved in a cylinder. The piston separates the cylinder chamber into two parts. One part belongs to the operating segment, the other guides into the reserve segment. In yet an alternative embodiment the pressure in the operating segment shifts a moveable rigid body against a fixed rigid body of the valve. A spring also shifts the rigid body against the moveable rigid body against the fixed rigid body. The coil being set under electric current or a further actuator shifts the moveable rigid body against the pressure and against the spring force away from the fixed rigid body and opens the relief valve 45.

The relief valve 45 can open very quickly the pressure releasing line 51 which connects the operating segment with the reserve segment. This step of quickly opening provides a relief valve 45 which can open the pressure releasing line 51 very quickly. The effected decrease of the forming-side torque T_C often exceeds the increasing feeding-side torque T_F. The job controller 40 can trigger the relief valve 45 such that the triggered relief valve 45 opens this pressure releasing line 51. Opening the pressure releasing line 51 immediately decreases the pressure in the closed loop.

The high-speed relief valve 45 causes a decrease of the torque consumption T_C taken by the bale forming means. Often the torque gradient of the decrease is larger than the feeding-side torque increase (torque gradient) which a clump of crop material or rigid object causes.

In an alternative embodiment a proportional valve fulfils the functions of the control valve 44 as well as of the relief valve 45 and can open the pressure releasing line 51 from the operating segment to the reserve segment. In one implementation an electric current runs through a coil of this proportional valve. The pressure which causes the proportional valve to open the pressure releasing line 51 is proportional to the current through the coil.

The job controller 40 receives the measured torque values T_F, T_C, calculates the input torque value T_I, and compares the input torque value T_I with a given torque threshold. In one embodiment the job controller 40 further calculates the increase of the input torque T_I, i.e. the temporal gradient dT_I/dt. The job controller 40 compares this torque increase dT_I/dt with a given torque gradient threshold.

As soon as the torque T_I is above the torque threshold and/or the torque increase dT_I/dt is above the given torque gradient threshold, the job controller 40 triggers the high-speed relief valve 45. The step automatically decreases the forming-side torque consumption T_C.

In one embodiment the control unit 40 further generates an alert which is displayed or otherwise output to the operator. In one implementation an optical as well as an acoustic alert is generated. The control unit 40 can additionally generate a recommendation how the operator can reduce the torque consumption of the feeding means and/or of the baler, e.g. by driving with less velocity or by driving in serpentines in order to better distribute the crop material in the bale forming chamber.

The triggered relief valve 45 opens the pressure releasing line 51. Fluid is pressed through the pressure releasing line 51 to the reserve segment of the closed loop. The pistons 41.1, 41.2 move in their cylinders. The volume available for the operating segment increases until a new stable state is reached. This movement decreases very quickly the retaining force which the piston-cylinder devices 27.1, 27.2 apply onto the tensioning arms 25.1, 25.2. The pressure which pressing belts 15 apply onto the crop material in the bale forming chamber decreases immediately. Therefore less power is required for driving the pressing belts 15. This step decreases the forming-side torque consumption T_C and therefore the input torque T_I.

In addition less power is required for injecting further crop material into the bale forming chamber. This effect is achieved as the retaining force of the piston-cylinder devices 27.1, 27.2 is reduced and injecting further crop material can be executed against a smaller retaining force. The chamber size increases.

Reducing the belt tension is in particular advantageous in the following situation: The pick-up unit 1 has picked-up a clump of crop material from the ground. This clump is conveyed towards and into the bale forming chamber. This step increases the torque consumption T_F taken by the feeding means in particular as the pressure of the crop material in the bale forming chamber against the pressing belts 15 increases. The job controller 40 opens the relief valve 45. Less torque T_I is available for the bale forming means. But thanks to the invention the clump can nevertheless be injected into the bale forming chamber.

It is possible that further crop material is injected into the bale forming chamber while the relief valve 45 is opened. Therefore the throughput through the baler is decreased but the baler continuous to operate (picking-up, conveying, forming a bale). Injecting further crop material enlarges the bale forming chamber, makes the tensioning arms 25.1, 25.2 pivoting, and causes further fluid to flow from the operating segment into the reserve segment of the closed hydraulic loop.

The torque sensors 37, 38 continue to measure values for the torques T_C, T_F. Decreasing the tension which the pressing belts 15 apply onto the crop material in the bale forming chamber will decrease the torque consumption T_C of the bale forming means. Therefore the input torque value T_I will also decrease below the given torque threshold.

In one embodiment the relief valve 45 again closes the pressure releasing line 51 to the reserve segment immediately as soon as the input torque value T_I has decreased below the given torque threshold. But this implementation may immediately increase the input torque T_I again and may lead to a high input torque gradient dT_I/dt. This may cause undesired oscillations.

To avoid these undesired oscillations in the sequence of the input torque values, preferably a time span is given. The job controller 40 triggers the relief valve 45 to close the pressure releasing line 51 after the following two events have occurred:
  The input torque T_I drops below the given torque threshold.
  The given time span passes and the input torque T_I remains under this threshold throughout the entire time span.

After this time span the job controller 40 triggers the relief valve 45 to close the connecting line 51.

Figure 3:
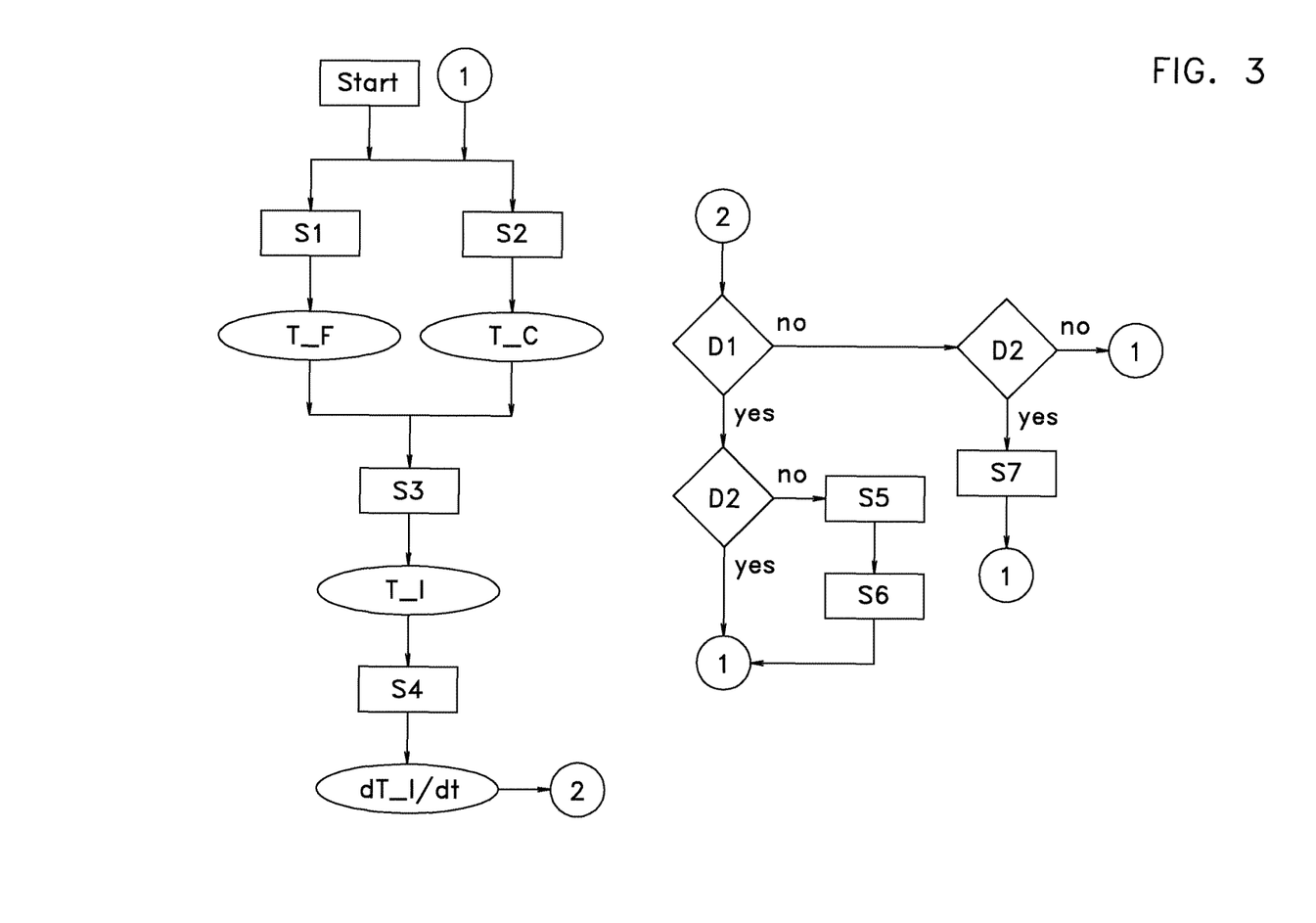
FIG. 3   shows a flow diagram how the torque reduction is performed.

FIG. 3 shows one implementation of a procedure which the control unit 40 automatically executes for every sampling time point. The reference signs have the following meanings:

Step S1: Obtain from the feeding-side torque sensor 37 the feeding-side torque T_C.
Step S2: Obtain from the chamber-side torque sensor 38 the chamber-side torque C_C.
Step S3: Calculate from T_F and T_C the input torque value T_I.
Step S4: Calculate from the last values for the input torque T_I the torque gradient dT_I/dt.
Decision D1: Decide if one of the following events has occurred:
  T_I is greater than the given torque threshold.
  dT_I/dt is increasing and is greater than the given gradient threshold.
Decision D2: Decide whether or not the relief valve 45 is open.
Step S5: Trigger the step of opening the relief valve 45.
Step S6: Keep the relief valve 45 open for the given time span.
Step S7: Trigger the step of closing the relief valve 45.

As the pressure in the operating segment of the closed hydraulic loop is below the pressure threshold, the control valve 44 also remains closed. The piston-cylinder devices 27.1, 27.2 block a pivotal movement of the tensioning arms 25.1, 25.2. Further crop material which has been injected into the bale forming chamber increases the pressure in the bale forming chamber.

The embodiment just described applies for a round baler with pressing belts 15 surrounding a drum-shaped bale forming chamber with variable size. A similar embodiment can be used for a round baler which forms cylindrical bales by means of several pressing rollers surrounding the drum-shaped bale forming chamber and touching the crop material. One embodiment of decreasing the torque consumption is combined with an embodiment where at least one pressing roller, preferably several adjacent driven pressing rollers, are mounted on a pivotal holding arrangement, e.g. between a left holding arm and a right holding arm wherein the pivotal pressing rollers extend from one holding arm to the other holding arm. This holding arrangement carrying one or several pressing rollers can be pivoted around a pivoting axis perpendicular to the travelling direction 10, i.e. parallel to the rotating axes of the pressing rollers. Pivoting the holding arrangement increases or decreases the size of the bale forming chamber.

In one embodiment the increasing bale tends to pivot the holding arrangement in a direction such that the bale forming chamber is increased. The bale forming chamber can only be enlarged against the force of a retaining means for the holding arrangement, e.g. against two hydraulic piston-cylinder devices which operates like the piston-cylinder devices 27.1, 27.2 for the tensioning arms 25.1, 25.2. In a further embodiment a double-acting piston-cylinder device can pivot the holding arrangement in both directions.

The job controller 40 operates as described above and opens the relief valve 45 in the case of an input torque value T_I above the torque threshold. This event has the effect that the holding arrangement for the movable pressing rollers is pivoted. The pressure which the pressing rollers on the holding arrangement apply onto the bale in the bale forming chamber is decreased immediately.

As mentioned above the bale in the bale forming chamber is wrapped into a net or foil if the bale has reached a given diameter or weight. The bale can be wrapped in the bale forming chamber with closed or with opened relief valve 45.

The following embodiments apply for a baler with pressing belts as well as with pressing rollers. The procedure as sketched above achieves a shift of the torque consumption. However it may cause a problem if the relief valve 45 is opened shortly before the bale B has reached the required size or diameter or weight. The reason: The pressure of the crop material makes the size of the bale forming chamber to increase. Injecting further crop material into the bale forming chamber may yield a bale which is too large and/or has an insufficient density or a too high weight. Therefore in one possible embodiment two size thresholds are given:
  standard size threshold and a high torque size threshold being smaller than the standard size threshold.

As long as the input torque T_I is below the given torque threshold and the relief valve 45 is closed, crop material is injected until the size or weight of the bale B has reached the standard size threshold. The wrapping apparatus 11 is triggered as soon as the bale size B has reached the standard size threshold.

But if the input torque value T_I exceeds the torque threshold while the bale size is below the standards size threshold and above the high torque size threshold, the wrapping apparatus 11 is triggered—although the size of the bale B has not reached the standard bale size threshold. Triggering the wrapping apparatus 11 is preferably connected with the step that no further crop material is injected into the bale forming chamber until the bale B is wrapped and ejected. In place of two size thresholds two alternative thresholds can be used, e.g. two weight thresholds.

Further possible measures for reducing the torque consumption T_C taken by the bale forming means will now be described. As sketched above a wrapped bale B is ejected out of the bale forming chamber by pivoting the tailgate 5 with respect to the front housing 4 around the pivoting axis 30, cf. FIG. 1. Therefore the tailgate 5 can be moved into a bale ejecting position in which the tailgate 5 is opened for forming a bale ejecting aperture. The tailgate 5 can be moved back into a bale forming position in which the tailgate 5 is connected with the front housing 4 and the tailgate 5 and the front housing 4 together form the bale forming chamber. This mechanical connection is preferably established by means of locking pawls and corresponding pins whereas an actuator can move the locking pawls and can thereby lock or release the tailgate 5.

In one embodiment the tailgate 5 can in addition be transferred into an intermediate position (enlarged state) between the bale forming position and the bale ejecting position. If the tailgate 5 is in this intermediate position, the bale forming chamber is larger than with the tailgate 5 in the bale forming position. This effect occurs in particular if some pressing rollers or guiding rollers for the pressing belts 15 are mounted at the tailgate 5. Preferably the tailgate 5 being in the bale forming position overlaps with the front housing 4 such that no gap between the tailgate 5 and the front housing 4 occurs if the tailgate 5 is pivoted into the intermediate position. The tailgate 5 remains connected with the front housing 4 such that the formation of a bale B in the bale forming chamber can be continued. The bale forming means consumes less torque while the bale forming chamber is in the intermediate position compared with the bale forming position.

After having obtained the trigger signal, the job controller 40 triggers the step that the tailgate 5 is pivoted into the intermediate position. In one embodiment the locking pawls or the locking pins are pivotally mounted. The job controller 40 triggers an actuator which pivots the locking pawl or the locking pin. After this pivoting step the locking pawls still engage the locking pins. This step and the pressure of the bale B in the bale forming chamber pivots the tailgate 5 from the bale forming position into the intermediate position.

A further possible measure for reducing the input torque is to decelerate the pulling tractor. In one implementation an alert is generated to the driver of the tractor. In a further implementation the control unit 40 of the baler transmits a message to the control unit of the tractor and the tractor control unit automatically decelerates the tractor and by this also the pulled baler.

Reference signs used in the claims will not limit the scope of the claimed invention. The term "comprises" does not exclude other elements or steps. The articles "a", "an", and "one" do not exclude a plurality of elements. Features specified in several depending claims may be combined in an advantageous manner.

8. LIST OF REFERENCE SIGNS

| | |
|---|---|
| 1 | pick-up unit |
| 2 | knives of the cutting assembly |
| 3 | conveying rotor with rigid tines |
| 4 | stationary front housing |
| 5 | tailgate, pivotally mounted at the front housing 4 in the axis 30 |
| 9 | rotating direction in which the pressing belts 15 and the pressing rollers 20.1, 20.2, 20.3 rotate the bale B. |
| 10 | travelling direction of the baler |
| 11 | wrapping apparatus with the pulling rollers 22.1, 22.2 and the reel 21 |
| 12 | inlet for the crop material M, arranged between the starter rollers 20.2, 20.3 |
| 14 | driven guiding roller for the pressing belts 15 |
| 15 | pressing belts |
| 18.1, 18.2 | idler guiding rollers on the tensioning arm 25 |
| 19 | further idler roller |
| 20.1, 20.2, 20.3 | driven pressing rollers (starter rollers) |
| 21 | rotatable reel with wrapping material |
| 22.1, 22.2 | rollers for pulling the wrapping material 23 |
| 23 | web of wrapping material |
| 24 | inlet for the wrapping material 23, positioned between the rollers 19 and 20.1 |
| 25.1 | left tensioning arm, carries the guiding rollers 18.1, 18.2 |
| 25.2 | right tensioning arm, carries the guiding rollers 18.1, 18.2 |
| 26 | common rotating axle of the tensioning arms 25.1, 25.2 |
| 27.1 | left hydraulic piston-cylinder device, serves as the retaining means for the left tensioning arm 25.1 |
| 27.2 | right hydraulic piston-cylinder device, serves as the retaining means for the right tensioning arm 25.2 |
| 30 | pivoting axis of the tailgate 5 |
| 31 | input shaft of the baler, drives the feeding means 1, 3 and the bale forming means 15, 20.1, 20.2, 20.3 via the output shafts 34, 35 |
| 32 | overload clutch, protects and interrupts the input shaft 31 in the case of an overload situation |
| 33 | transmission assembly between the input shaft 31 and the output shafts 34, 35 |
| 34 | feeding-side output shaft |
| 35 | forming-side output shaft |
| 36 | bevel gear in the transmission assembly 33 |
| 37 | feeding-side torque sensor, measures the torque T_F at the feeding-side output shaft 34 |
| 38 | forming-side torque sensor, measures the torque T_C at the forming-side output shaft 35 |
| 39 | accumulator, serves as reservoir for fluid in the closed loop (operating segment) |
| 40 | control unit (job controller), evaluates the values from the torque sensors 37, 37 and triggers the valves 44, 45 |
| 41.1 | piston of the left retaining piston-cylinder device 27.1 |
| 41.2 | piston of the right retaining piston-cylinder device 27.2 |
| 42.1 | part of the chamber of the left piston-cylinder device 27.1 through which the rod of the piston 41.1 extends (left upper part, left rod-side chamber) |
| 42.2 | part of the chamber of the right piston-cylinder device 27.2 through which the rod of the piston 41.2 extends (right upper part, right rod-side chamber) |
| 43.1 | part of the left piston-cylinder device 27.1 which is arranged between the piston 41.1 and the bottom of the cylinder 27.1 (left lower part, left base-side chamber) |
| 43.2 | part of the right piston-cylinder device 27.2 which is arranged between the piston 41.2 and the bottom of the cylinder 27.2 (right lower part, right base-side chamber) |
| 44 | control valve, keeps the pressure in the closed loop below a given pressure threshold, can open the pressure releasing line 51 |
| 45 | high-speed relief valve, can be triggered by the control unit 40, decreases the pressure in the closed loop, can open the pressure |

| | -continued |
|---|---|
| | releasing line 51 |
| 46 | pressure transmitter, measures the pressure P_C |
| 47 | virtual terminal, displays alerts to the operator |
| 50 | line to the reservoir 39, can be opened by the control valve 44 or by the relief valve 45 |
| 51 | pressure releasing line from the operating segment to the reserve segment, can be opened by the control valve 44 and the relief valve 45 |
| B | increasing bale in the bale forming chamber |
| M | picked-up loose crop material |
| P_C | pressure of the fluid in the closed loop (operating segment) with the lower parts 43.1, 43.2 and the upper parts 42.1, 42.2 of the cylinders 27.1, 27.2 |
| r_C | forming-side transmission ratio |
| r_F | feeding-side transmission ratio |
| T_C | forming-side torque value |
| T_F | feeding-side torque value |
| T_I | input torque value |

The invention claimed is:

1. A bale forming apparatus comprising:
   a bale former;
   a feeder;
   a drive arrangement;
   a torque measuring arrangement; and
   a control unit;
wherein the drive arrangement comprises
   an input shaft;
   a feeding-side output shaft; and
   a forming-side output shaft,
   wherein the feeder is arranged to convey loose material to the bale former,
   wherein the bale former is arranged to form a bale from the loose material,
   wherein the input shaft is arranged to drive the feeding-side output shaft and the forming-side output shaft,
   wherein the feeding-side output shaft is arranged to drive the feeder, and
   wherein the forming-side output shaft is arranged to drive the bale former,
   wherein the torque measuring arrangement is arranged to calculate a value indicative of a provided input torque value,
   wherein the provided input torque value is the torque which the input shaft provides for driving the forming-side output shaft and the feeding-side output shaft, and
   wherein the control unit is arranged to trigger the bale former for reducing a torque consumption from the forming-side output shaft if at least one calculated input torque value is above a given torque threshold.

2. The bale forming apparatus according to claim 1, wherein the bale former comprises:
   at least one pressing belt; and
   a tensioning device,
   wherein the or every pressing belt partially surrounds a bale forming chamber,
   wherein the bale former is arranged to form a bale in the bale forming chamber,
   wherein the tensioning device is arranged to tension the or every pressing belt, and
   wherein the control unit is arranged to trigger the tensioning device for reducing the tension of the or every pressing belt if the calculated input torque value is above the given torque threshold.

3. The bale forming apparatus according to claim 2, wherein the tensioning device comprises:
   a retaining member; and
   a tension reduction member,
   wherein the retaining member is arranged to keep the or every pressing belt under tension,
   wherein the tension reduction member is arranged to reduce the tension under which the or every pressing belt is kept by the retaining member, and
   wherein the control unit is arranged to trigger the tension reduction member if the calculated input torque value is above the given torque threshold.

4. The bale forming apparatus according to claim 1, wherein the torque measuring arrangement comprises:
   a feeding-side torque sensor; and
   a forming-side torque sensor,
   wherein the feeding-side torque sensor is arranged to measure a value indicative of the torque taken from the feeding-side output shaft,
   wherein the forming-side torque sensor is arranged to measure a value indicative of the torque taken from the forming-side output shaft,
   wherein the bale forming apparatus is arranged to derive at least one aggregated torque value by using at least one measured value indicative of the forming-side torque value and at least one measured value indicative of the feeding-side torque value, and
   wherein the control unit is arranged to trigger the forming-side torque consumption reduction if at least one aggregated torque value is above the given torque threshold.

5. The bale forming apparatus according to claim 1, wherein the bale forming apparatus comprises an overload protecting device,
   wherein the overload protecting device is arranged to disconnect or to interrupt the input shaft of the bale forming apparatus if at least one value indicative of the torque provided by the input shaft exceeds a given overload threshold and the given overload threshold is above the given torque threshold.

6. The bale forming apparatus according to claim 1, wherein the bale forming apparatus comprises a bale size sensor,
   wherein the bale size sensor is arranged to measure a value indicative of a dimension of a bale in the bale forming apparatus,
   wherein the control unit is arranged to trigger the reduction of the torque consumption taken from the forming-side output shaft if at least one calculated input torque value is above the torque threshold and if the measured bale dimension value is below a given bale size threshold, and
   wherein the control unit is arranged to trigger a reduction of the torque consumption taken from the feeding-side output shaft if at least one calculated input torque value is above the torque threshold and if the bale dimension value is above a given bale size threshold.

7. The bale forming apparatus according to claim 6, wherein the bale forming apparatus comprises a wrapping device,
   wherein the bale former is arranged to form and to wrap a bale in a bale forming chamber,
   wherein the wrapping device is arranged to provide wrapping material to the bale forming chamber, and
   wherein the control unit is arranged to trigger the wrapping device for starting providing wrapping material to the bale forming chamber if the calculated input torque value is above the torque threshold and if the bale dimension value is above the bale size threshold.

8. A bale forming method, wherein the method is performed by using a bale forming apparatus comprising:

a bale former;
a feeder;
a drive arrangement;
a torque measuring arrangement, and
a control unit;
wherein the drive arrangement comprises:
   an input shaft;
   a feeding-side output shaft; and
   a forming-side output shaft,
wherein the method comprises the steps of:
the feeder conveying loose material towards the bale former; and
the bale former forming a bale from the conveyed loose material,
wherein the feeder is driven by the feeding-side output shaft,
wherein the bale former is driven by the forming-side output shaft, and
wherein the feeding-side output shaft and the forming-side output shaft both are driven by the input shaft,
wherein a value indicative of a calculated input torque value is calculated,
wherein the calculated input torque value is a value indicative of the torque which the input shaft provides for driving the feeding-side output shaft and the forming-side output shaft, and
wherein the control unit triggers the bale former such that a torque consumption by the bale former from the forming-side output shaft is reduced if at least the calculated input torque value is above a given torque threshold.

9. The bale forming method according to claim 8, wherein several times a respective value indicative of the calculated input torque is measured and the control unit triggers the reduction of the torque consumption also if the calculated input torque increases and the input torque increase is above a given torque increasing threshold.

10. The bale forming method according to claim 8, wherein several times a respective value indicative of the calculated input torque is measured and the control unit triggers the reduction of the torque consumption if several subsequent calculated input torque values are all above the given torque threshold.

11. The bale forming method according to claim 8, wherein the bale former comprises:
   at least one pressing belt; and
   a tensioning device,
wherein the or every pressing belt partially surrounds a bale forming chamber, wherein the method further comprises the steps of:
   the bale former forming the bale in the bale forming chamber;
   the tensioning device tensioning the or every pressing belt while the bale is formed in the bale forming chamber; and
   the control unit triggering the tensioning device for reducing the tension of the or every pressing belt if at least one measured input torque value is above the given torque threshold.

* * * * *